US012724940B2

(12) United States Patent
Nakagawa et al.

(10) Patent No.: US 12,724,940 B2

(45) Date of Patent: Sep. 1, 2026

(54) VIBRATION AND NOISE REDUCTION ANALYSIS DEVICE AND ANALYSIS METHOD FOR PANEL PART OF AUTOMOBILE

(71) Applicant: JFE STEEL CORPORATION, Tokyo (JP)

(72) Inventors: Koichi Nakagawa, Tokyo (JP); Takanobu Saito, Tokyo (JP); Tsuyoshi Shiozaki, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 938 days.

(21) Appl. No.: 18/008,936

(22) PCT Filed: Apr. 6, 2021

(86) PCT No.: PCT/JP2021/014571

§ 371 (c)(1), (2) Date: Dec. 7, 2022

(87) PCT Pub. No.: WO2022/004087

PCT Pub. Date: Jan. 6, 2022

(65) Prior Publication Data

US 2023/0237216 A1 Jul. 27, 2023

(30) Foreign Application Priority Data

Jul. 1, 2020 (JP) ................................. 2020-113763

(51) Int. Cl.

*G06F 30/20* (2020.01)
*G06F 30/15* (2020.01)
*G06F 119/10* (2020.01)

(52) U.S. Cl.

CPC ............. *G06F 30/20* (2020.01); *G06F 30/15* (2020.01); *G06F 2119/10* (2020.01)

(58) Field of Classification Search

None

See application file for complete search history.

(56) References Cited

U.S. PATENT DOCUMENTS

2010/0299107 A1 11/2010 Umayahara et al.
2022/0245303 A1 * 8/2022 Nakagawa ............. G06F 30/15

(Continued)

FOREIGN PATENT DOCUMENTS

JP 2007-186086 A 7/2007
JP 2010-230584 A 10/2010

(Continued)

OTHER PUBLICATIONS

"Altair OptiStruct," Terrabyte Co., Ltd., [URL: https://www.terrabyte.co.jp/Hyper/OptiStruct-3.htm].

(Continued)

*Primary Examiner* — Paul S Schwarzenberg

(74) *Attorney, Agent, or Firm* — Oliff PLC

(57) ABSTRACT

A vibration and noise reduction analysis device for a panel part of an automobile is configured to reduce vibration and noise of the panel part caused by vibration from a vibration source and a noise source in the automobile and identify a portion at which a weight of an automotive body of the automobile can be reduced. The vibration and noise reduction analysis device includes: an automotive body model acquisition unit; a sectioned region setting unit; a vibration and noise reduction target panel part model setting unit; a vibration mode/equivalent radiation power peak frequency selection unit; a sectioned region weight change peak frequency acquisition unit; a sectioned region weight contribution degree calculation unit; and a vibration and noise reduction and weight reduction portion identification unit.

4 Claims, 5 Drawing Sheets

(56) References Cited

U.S. PATENT DOCUMENTS

| | | | | |
|---|---|---|---|---|
| 2022/0350940 | A1* | 11/2022 | Nakagawa | B62D 25/20 |
| 2025/0298935 | A1* | 9/2025 | Li | G06F 30/20 |
| 2025/0371218 | A1* | 12/2025 | Ageba | G06F 30/15 |

FOREIGN PATENT DOCUMENTS

| | | | | |
|---|---|---|---|---|
| JP | 2015185143 | A | | 10/2015 |
| JP | 2019114114 | A | * | 7/2019 |
| WO | 2020/070922 | A1 | | 4/2020 |

OTHER PUBLICATIONS

Jun. 29, 2021 International Search Report issued in International Patent Application No. PCT/JP2021/014571.
Bös, "Numerical Optimization of the Thickness Distribution of Three-Dimensional Structures with Respect to Their Structural Acoustic Properties," Structural and Multidisciplinary Optimization, Apr. 20, 2006, vol. 32, No. 1, pp. 12-30.
Sangtae, "What is ERP which is used in RecurDyn/Acoustics?," Retrieved from the Internet: URL: <https://support.functionbay.com/en/faq/single/205/WhatisERP-en> [retrieved on Sep. 29, 2023].
Oct. 9, 2023 Extended Search Report issued in European Patent Application No. 21833592.5.
Mar. 24, 2026 Office Action issued in Chinese Patent Application No. 202180044836.X (with concise explanation in English).

* cited by examiner

VIBRATION AND NOISE REDUCTION ANALYSIS DEVICE AND ANALYSIS METHOD FOR PANEL PART OF AUTOMOBILE

FIELD

The present invention relates to a vibration and noise reduction analysis device and an analysis method for a panel part of an automobile, and more particularly, to a vibration and noise reduction analysis device and an analysis method for a panel part of an automobile that reduce vibration and noise of the panel part caused by vibration from a vibration source and a noise source in the automobile and identify a portion at which a weight of an automotive body can be reduced.

BACKGROUND

Automobile panel parts such as a floor panel, a dash lower panel, and a roof panel are manufactured by press-forming a steel sheet, an aluminum alloy sheet, or a product obtained by plating these with a Zn alloy or the like. Vibration of these panel parts causes road noise and booming noise, and as such, internal vehicle noise deteriorates. Therefore, it is required to reduce internal vehicle noise in order to improve silent property of an automobile and a commercial value thereof.

The vibration and noise of a panel part 103 in an automobile 100 including a body frame part 101 forming an automotive body frame and the panel part 103, as illustrated in FIG. 2, is caused by (a) vibration input from an engine 105*a* of the automobile 100 or a road surface or the like through tires 105*b* during traveling, (b) propagation of the vibration by the body frame part 101, and (c) vibration of the panel part 103.

In the related art, as a technique for reducing (c) the vibration and noise of the panel part 103, it is considered effective to apply a bead to the panel part. Non-Patent Literature 1 discloses a technique for obtaining an optimum position of a bead to be applied to a panel part to be reduced in vibration and noise as topography optimization. However, in an automobile in which design is regarded as important, it is difficult to directly apply a bead to an automobile outer panel part such as a roof panel, and there is a problem in that the bead interferes with an adjacent automobile inner panel part. As a result, it has been required to take measures for (b) the body frame part 101 which is a vibration propagation path of the automobile.

Therefore, some techniques have been proposed so far in order to reduce the vibration of the panel part by taking measures for the body frame part of the vibration propagation path of the automobile. For example, Patent Literature 1 discloses a technique for preventing vibration of a roof panel even when resonance occurs in an automotive body frame due to engine vibration or the like. The technique disclosed in Patent Literature 1 is a roof structure for an automotive body in which a roof panel is joined onto a plurality of roof bows provided at a predetermined distance in a forward-and-rearward direction of the automotive body. Here, in the roof structure, a width of a central portion in an automotive body width direction of a certain roof bow and at least one roof bow adjacent to the roof bow is formed to be wider than widths of other roof bows.

CITATION LIST

Patent Literature

Patent Literature 1: JP 2007-186086 A

Non Patent Literature

Non Patent Literature 1: "structural optimization design software Altair OptiStruct", [online], [searched on Jul. 18, 2019], Internet <URL:https://www.terrabyte.co.jp/Hyper/OptiStruct-3.htm>

SUMMARY

Technical Problem

However, the technique disclosed in Patent Literature 1 has a problem in that weight is significantly increased by forming the central portion of the roof bow to be wide, and there is a case in which it is difficult to realize the technique because interference with other parts occurs when the shape of the body frame part is significantly changed. Therefore, there has been a demand for a technique capable of efficiently reducing vibration and noise of a panel part while reducing the weight of an automotive body without significantly changing the shape of parts.

The present invention has been made in view of the above problems, and an object of the present invention is to provide a vibration and noise reduction analysis device and an analysis method for a panel part of an automobile that reduce vibration and noise of the panel part caused by vibration from a vibration source and a noise source in the automobile and identify a portion at which a weight of an automotive body of the automobile can be reduced.

Solution to Problem

A vibration and noise reduction analysis device for a panel part of an automobile according to the present invention is configured to reduce vibration and noise of the panel part caused by vibration from a vibration source and a noise source in the automobile and identify a portion at which a weight of an automotive body of the automobile can be reduced, and includes: an automotive body model acquisition unit configured to acquire an automotive body model including a body frame part model and a panel part model obtained by modeling each of a body frame part and a panel part forming the automotive body of the automobile with a mesh, in which an excitation position where the vibration from the vibration source and the noise source is input is set; a sectioned region setting unit configured to set a plurality of sectioned regions sectioned based on the body frame part model and the panel part model in the automotive body model; a vibration and noise reduction target panel part model setting unit configured to set, as a vibration and noise reduction target panel part model, a panel part model of a panel part to be reduced in vibration and noise among the panel part models in the automotive body model in response to an instruction from an operator; a vibration mode/equivalent radiation power peak frequency selection unit configured to perform vibration analysis using the automotive body model, to obtain a vibration behavior of the vibration and noise reduction target panel part model and a frequency characteristic of equivalent radiation power which is an index of the vibration and noise, and to select a vibration mode having a large contribution to the vibration and noise and a peak frequency of the equivalent radiation power corresponding to the vibration mode; a sectioned region weight change peak frequency acquisition unit configured to change a weight of one or a plurality of sectioned regions in the automotive body model, to perform the vibration analysis for each combination of weights of the sectioned regions in the automotive body model, and to acquire a peak frequency of equivalent radiation power of the vibration and noise reduction target panel part model in a vibration mode selected by performing processing in the vibration mode/equivalent radiation power peak frequency selection unit; a sectioned region weight contribution degree calculation unit configured to perform multivariate analysis in which the peak frequency of the equivalent radiation power of the vibration and noise reduction target panel part model is set as an objective variable and the weight of the sectioned region is set as an explanatory variable, and to calculate a contribution degree of the weight of the sectioned region to the peak frequency of the equivalent radiation power of the vibration and noise reduction target panel part model; and a vibration and noise reduction and weight reduction portion identification unit configured to identify a portion to be reduced in weight in the automotive body of the automobile in order to reduce the vibration and noise of the panel part to be reduced in vibration and noise based on the calculated contribution degree of each of the sectioned regions.

A vibration and noise reduction analysis method for a panel part of an automobile according to the present invention causes a computer to perform following steps to reduce vibration and noise of the panel part caused by vibration from a vibration source and a noise source in the automobile and to identify a portion at which a weight of an automotive body of the automobile can be reduced, and includes: an automotive body model acquisition step of acquiring an automotive body model including a body frame part model and a panel part model obtained by modeling each of a body frame part and a panel part forming the automotive body of the automobile with a mesh, in which an excitation position where the vibration from the vibration source and the noise source is input is set; a sectioned region setting step of setting a plurality of sectioned regions sectioned based on the body frame part model and the panel part model in the automotive body model; a vibration and noise reduction target panel part model setting step of setting, as a vibration and noise reduction target panel part model, a panel part model of a panel part to be reduced in vibration and noise among the panel part models in the automotive body model; a vibration mode/equivalent radiation power peak frequency selection step of performing vibration analysis using the automotive body model, obtaining a vibration behavior of the vibration and noise reduction target panel part model and a frequency characteristic of equivalent radiation power which is an index of vibration and noise, and selecting a vibration mode having a large contribution to the vibration and noise and a peak frequency of the equivalent radiation power corresponding to the vibration mode; a sectioned region weight change peak frequency acquisition step of changing a weight of one or a plurality of sectioned regions in the automotive body model, performing the vibration analysis for each combination of weights of the sectioned regions in the automotive body model, and acquiring a peak frequency of equivalent radiation power of the vibration and noise reduction target panel part model in a vibration mode selected by performing processing in the vibration mode/equivalent radiation power peak frequency selection step; a sectioned region weight contribution degree calculation step of performing multivariate analysis in which the peak frequency of the equivalent radiation power of the vibration and noise reduction target panel part model is set as an objective variable and the weight of the sectioned region is set as an explanatory variable, and calculating a contribution degree of the weight of the sectioned region to the peak frequency of the equivalent radiation power of the vibration and noise reduction target panel part model; and a vibration and noise reduction and weight reduction portion identification step of identifying a portion to be reduced in weight in the automotive body of the automobile in order to reduce vibration and noise of the panel part to be reduced in vibration and noise based on the calculated contribution degree of each of the sectioned regions.

The sectioned region weight contribution degree calculation step may include deriving a relational expression between the peak frequency of the equivalent radiation power of the vibration and noise reduction target panel part model and the weight of each of the sectioned regions, predicting the peak frequency of the equivalent radiation power of the vibration and noise reduction target panel part model by changing the weight of at least one or more of the sectioned regions and giving the changed weight to the derived relational expression, and identifying a portion to be reduced in weight in the automotive body of the automobile to reduce the vibration and noise of the panel part caused by the vibration from the vibration source and the noise source in the automobile.

The sectioned region weight contribution degree calculation step may include deriving a relational expression between the peak frequency of the equivalent radiation power of the vibration and noise reduction target panel part model and the weight of each of the sectioned regions, selecting one sectioned region for which a sheet thickness is to be calculated, calculating the weight of the selected one sectioned region by giving, to the derived relational expression, a weight of another sectioned region excluding the one sectioned region and the peak frequency of the equivalent radiation power of the vibration and noise reduction target panel part model, and calculating the sheet thickness of the body frame part model and/or the panel part model forming the one sectioned region based on the calculated weight of the one sectioned region.

When the weight of the one selected sectioned region is calculated by the relational expression, a correction value of correcting an influence of a change in the weight of the one sectioned region on the peak frequency of the equivalent radiation power may be given to the relational expression, and the weight of the one sectioned region may be calculated.

Advantageous Effects of Invention

According to the present invention, a contribution degree of a weight of a sectioned region set in an automotive body model to a peak frequency of the equivalent radiation power of a panel part model corresponding to a panel part to be reduced in vibration and noise is calculated, and the weight of the automotive body of the automobile is reduced on the basis of the calculated contribution degree, thereby making it possible to identify a portion contributing to reduction in vibration and noise from the panel part, and to achieve both reduction in vibration and noise from the panel part and reduction in weight of the automotive body.

DESCRIPTION OF EMBODIMENTS

Prior to describing a vibration and noise reduction analysis device and an analysis method for a panel part of an automobile according to an embodiment of the present invention, an automobile to be analyzed in the present invention will be described.

<Target Automobile>

Figure 2:
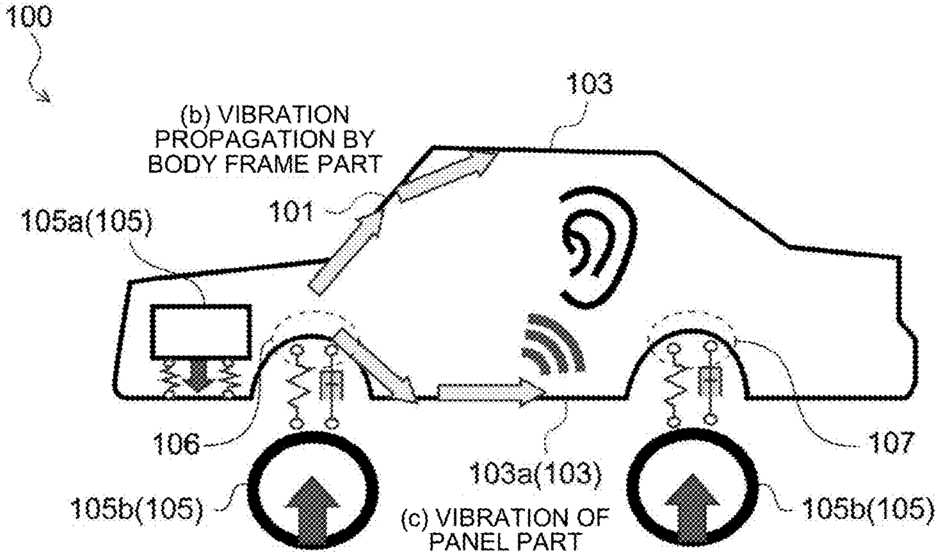
FIG. 2 is a diagram illustrating vibration and noise of the panel part caused by vibration propagated from a vibration source and a noise source in the automobile, which is a problem to be solved in the present invention.

As illustrated in FIG. 2, an automobile 100 to be analyzed in the present invention includes a body frame part 101, a panel part 103, and a vibration source and a noise source 105 that applies vibration (cyclic load) to an automotive body of the automobile 100.

The body frame part 101 is a part forming an automotive body frame of an automobile, and examples thereof include a roof rail, an A-pillar, a B-pillar, a C-pillar, and a side sill. The panel part 103 is an outer panel or an inner panel which is a part having a sheet structure, and examples thereof include a roof panel and a floor panel (for example, a middle floor and a rear floor). Examples of the vibration source and the noise source 105 include an engine 105*a*, a tire 105*b*, and the like, and during traveling of the automobile, vibration from a road surface is input to an excitation position such as a front suspension mounting part 106 and a rear suspension mounting part 107 through the tire 105*b*.

First to third embodiments of the present invention described below relate to an example in which a middle floor 103*a* of the automobile 100 is a panel part to be reduced in vibration and noise. However, in the present invention, another panel part (roof or rear floor) may be a panel part, the vibration and noise of which is to be reduced.

First Embodiment

<Vibration and Noise Reduction Analysis Device for Panel Part of Automobile>

A configuration of a vibration and noise reduction analysis device (hereinafter, simply referred to as a "vibration and noise reduction analysis device") for a panel part of an automobile according to the first embodiment of the present invention will be described below.

Figure 1:
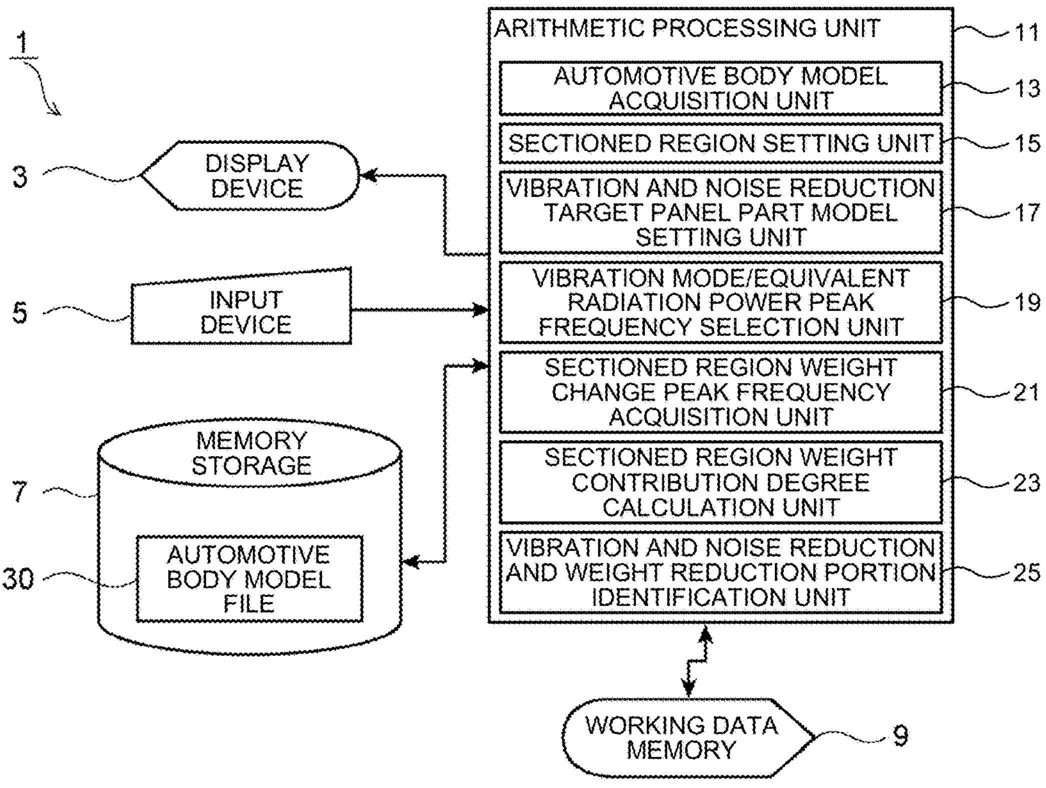
FIG. 1 is a block diagram of a vibration and noise reduction analysis device for a panel part of an automobile according to a first embodiment of the present invention.

A vibration and noise reduction analysis device 1 according to the present embodiment reduces vibration and noise of the panel part 103 caused by vibration from the vibration source and the noise source 105 in the automobile 100 (FIG. 2), and identifies a portion at which the weight of the automotive body of the automobile 100 can be reduced. As illustrated in FIG. 1, the vibration and noise reduction analysis device 1 is configured by a personal computer (PC) or the like, and includes a display device 3, an input device 5, a memory storage 7, a working data memory 9, and an arithmetic processing unit 11.

Then, the display device 3, the input device 5, the memory storage 7, and the working data memory 9 are connected to the arithmetic processing unit 11, and the respective functions thereof are executed by a command from the arithmetic processing unit 11. Hereinafter, each configuration of the vibration and noise reduction analysis device 1 will be described by taking, as an example, a case in which the middle floor 103*a*, which is one of the panel parts 103 of the automobile 100, is set as a vibration and noise reduction target.

<<Display Device>>

The display device 3 is used for displaying an analysis result or the like, and includes a liquid crystal monitor (LCD monitor) or the like.

<<Input Device>>

The input device 5 is used for a display instruction of an automotive body model file 30, a condition input by an operator, and the like, and includes a keyboard, a mouse, and the like.

<<Memory Storage>>

The memory storage 7 is used for storing various files such as the automotive body model file 30, and is configured by a hard disk or the like.

An automotive body model 200 (refer to FIG. 3) includes a plurality of body frame part models obtained by modeling a plurality of body frame parts forming an automotive body frame structure with a mesh (two-dimensional element and/or three-dimensional element), and a panel part model obtained by modeling a panel part with a mesh (two-dimensional element), in which an excitation position where vibration from a vibration source and a noise source in an automobile is input is set. Then, the automotive body model file 30 stores various types of information of the automotive body model 200, and stores information regarding elements and nodes of the body frame part model and the panel part model, information regarding material properties, and the like as the various types of information.

<<Working Data Memory>>

The working data memory 9 is used for temporary storage (storage) and calculation of data used by the arithmetic processing unit 11, and is configured by a random access memory (RAM) or the like.

<<Arithmetic Processing Unit>>

As illustrated in FIG. 1, the arithmetic processing unit 11 includes an automotive body model acquisition unit 13, a sectioned region setting unit 15, a vibration and noise reduction target panel part model setting unit 17, a vibration mode/equivalent radiation power peak frequency selection unit 19, a sectioned region weight change peak frequency acquisition unit 21, a sectioned region weight contribution degree calculation unit 23, and a vibration and noise reduction and weight reduction portion identification unit 25, and is configured by a central processing unit (CPU) such as a PC. Each of these units functions when the CPU executes a predetermined program. The functions of the respective units in the arithmetic processing unit 11 will be described below.

(Automotive Body Model Acquisition Unit)

The automotive body model acquisition unit 13 acquires the automotive body model 200, in which the excitation position is set, including a body frame part model and a panel part model obtained by modeling each of the body frame parts 101 and the panel parts 103 (FIG. 2) of the automobile 100 with a mesh (two-dimensional element and/or three-dimensional element).

Figure 3:
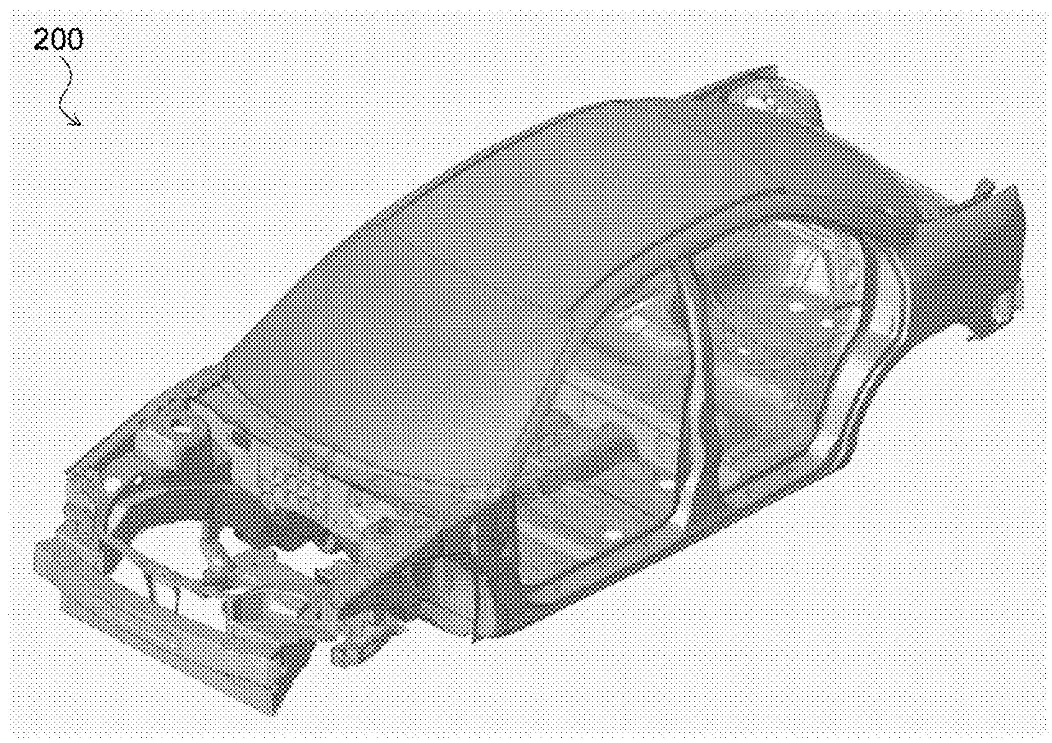
FIG. 3 is a diagram illustrating an example of an automotive body model to be analyzed in first to third embodiments of the present invention.
Figure 4:
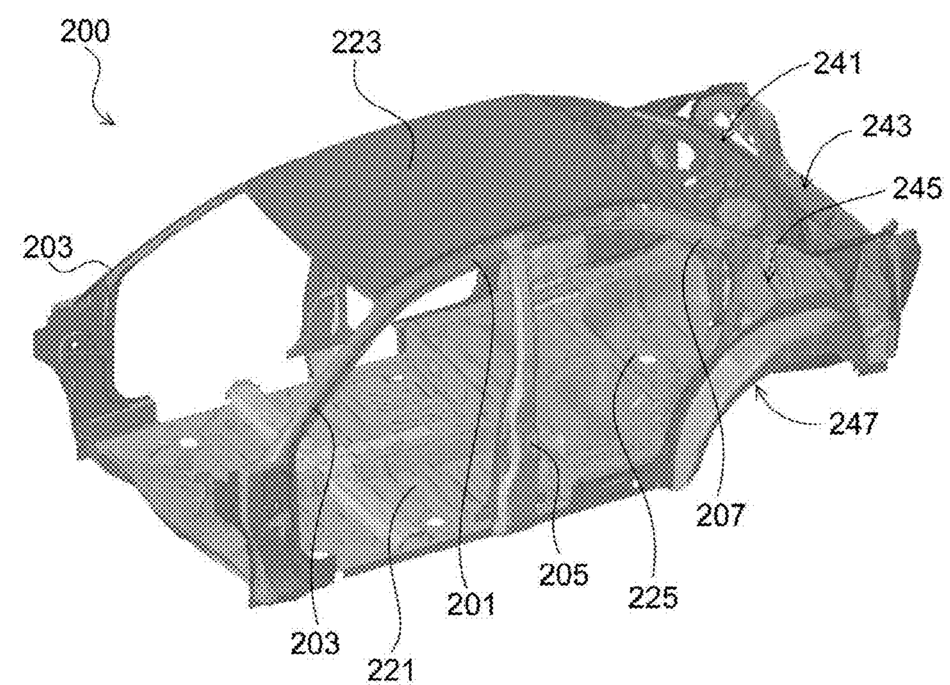
FIG. 4 is a perspective view of the automotive body model which is to be analyzed in the first to third embodiments of the present invention and includes a body frame part model and a panel part model, when viewed from above.
Figure 5:
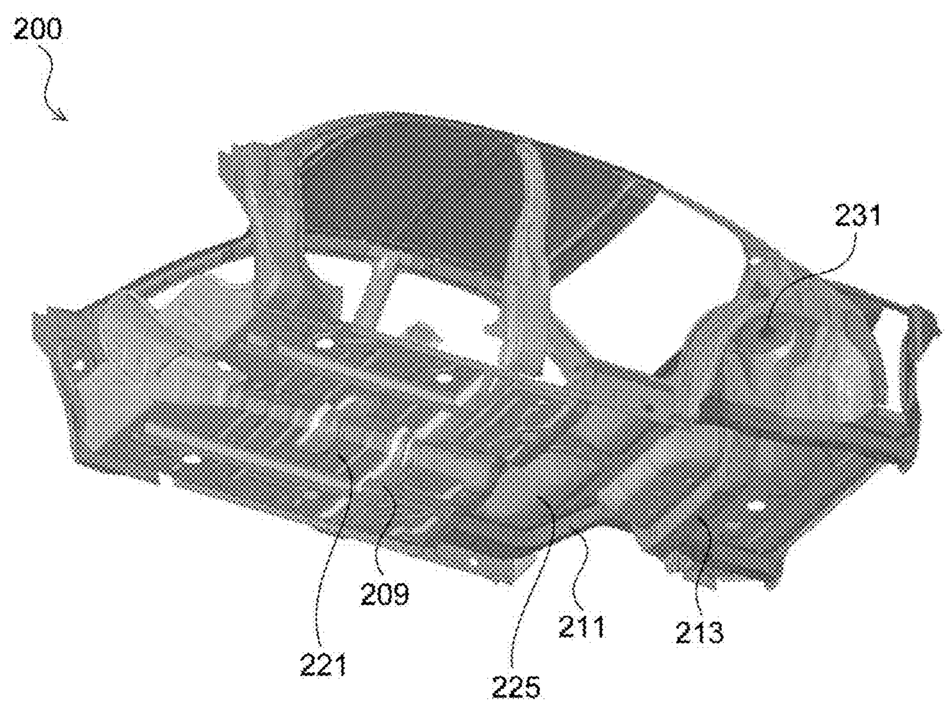
FIG. 5 is a perspective view of the automotive body model which is to be analyzed in the first to third embodiments of the present invention and includes the body frame part model and the panel part model, when viewed from below.

FIGS. 3 to 5 illustrate examples of the automotive body model 200 including the body frame part model and the panel part model.

Examples of the body frame part model include a roof rail model 201, an A-pillar model 203, a B-pillar model 205, a C-pillar model 207, a middle floor member model 209, a rear floor side member model 211, and a rear floor cross member model 213, which are modeled by a two-dimensional element and/or a three-dimensional element.

Examples of the panel part model include a roof model 223 and a rear floor model 225 in addition to a middle floor model 221 corresponding to a middle floor to be reduced in vibration and noise in the present embodiment, which are modeled by a two-dimensional element. An example of the excitation position includes an excitation position 231 corresponding to the rear suspension mounting part 107 to which vibration from a tire of an automobile is input.

The automotive body model 200 can be acquired by reading element information and material characteristic information from the automotive body model file 30 stored in the memory storage 7. Note that the excitation position 231 in the automotive body model 200 may be stored in the automotive body model 200 as information set in the automotive body model file 30 in advance, or may be set in the automotive body model 200 in response to an instruction of an operator after reading the automotive body model 200 from the automotive body model file 30.

(Sectioned Region Setting Unit)

The sectioned region setting unit 15 sets a plurality of sectioned regions sectioned on the basis of the body frame part model and the panel part model in the automotive body model 200.

Figure 6:
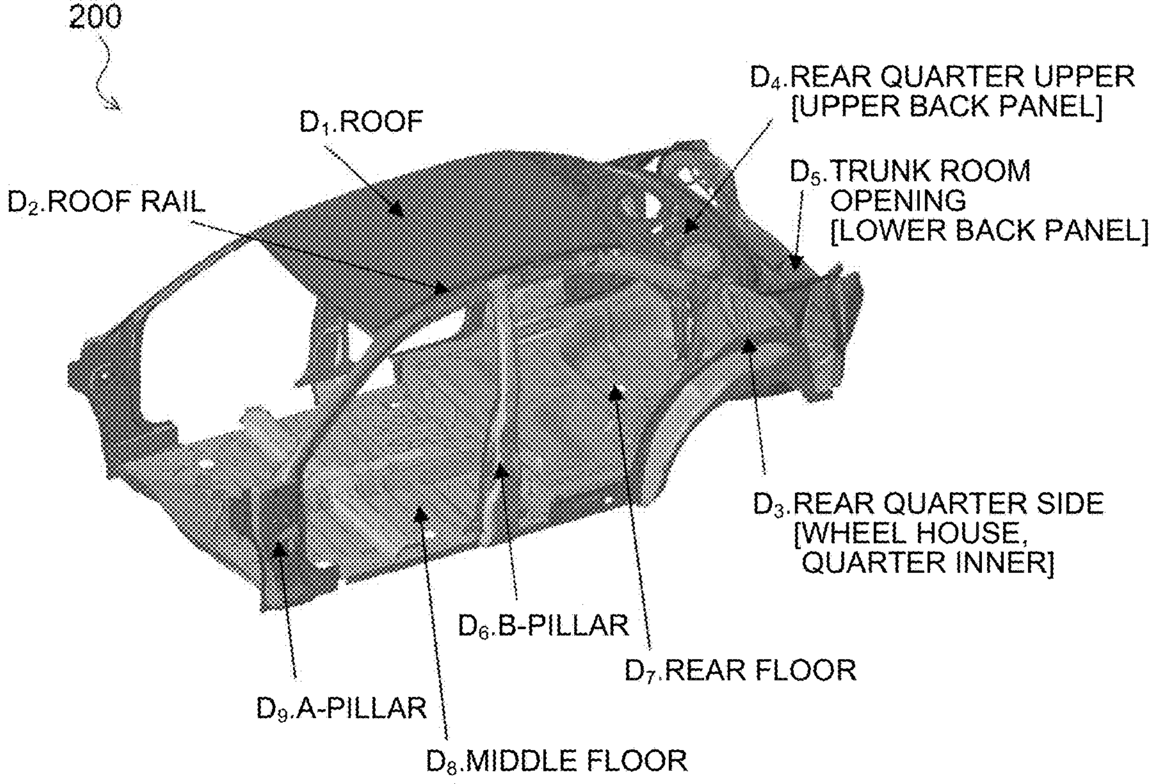
FIG. 6 is a perspective view of the automotive body model in which sectioned regions are set when viewed from above in the first to third embodiments of the present invention.
Figure 7:
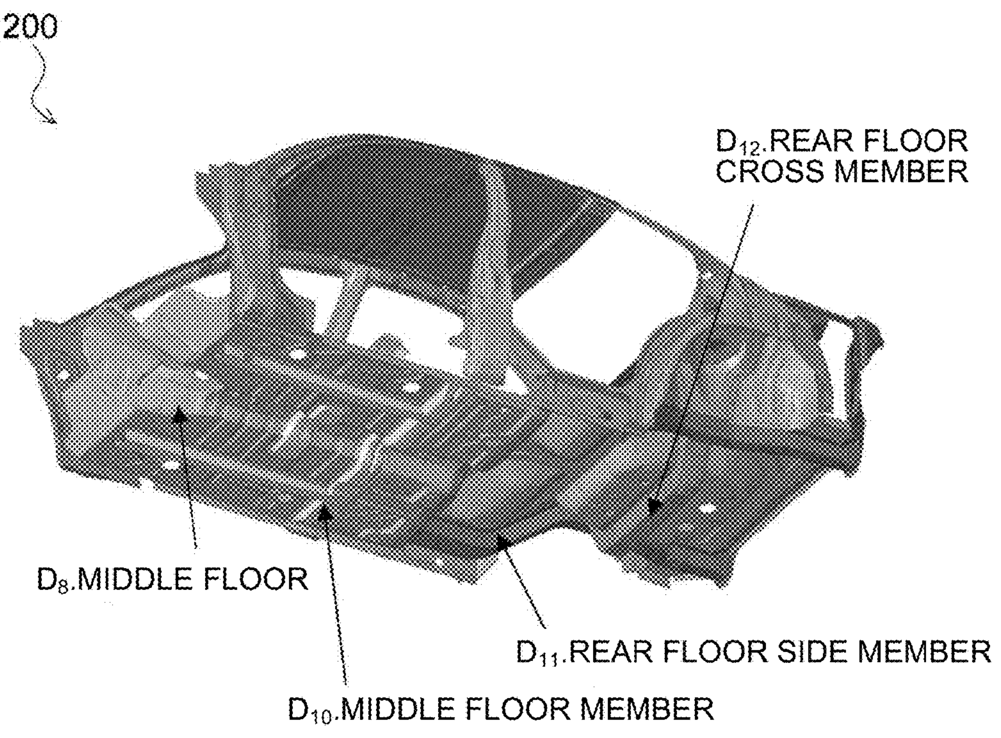
FIG. 7 is a perspective view of the automotive body model in which the sectioned regions are set when viewed from below in the embodiments of the present invention.

FIGS. 6 and 7 illustrate an example in which twelve sectioned regions $D_1$ to $D_{12}$ are set in the automotive body model 200. $D_1$.roof is a sectioned region sectioned by the roof model 223. $D_2$.roof rail is a sectioned region sectioned by the roof rail model 201. $D_3$.rear quarter side is a sectioned region sectioned by a wheel house model 247 and a quarter inner model 245. $D_4$.rear quarter upper is a sectioned region sectioned by an upper back panel model 241. $D_5$.trunk room opening is a sectioned region sectioned by a lower back panel model 243. $D_6$.B-pillar is a sectioned region sectioned by the B-pillar model 205. $D_7$.rear floor is a sectioned region sectioned by the rear floor model 225. $D_8$.middle floor is a sectioned region sectioned by the middle floor model 221. $D_9$.A-pillar is a sectioned region sectioned by the A-pillar model 203. $D_{10}$.middle floor member is a sectioned region sectioned by the middle floor member model 209. $D_{11}$.rear floor side member is a sectioned region sectioned by the rear floor side member model 211. $D_{12}$.rear floor cross member is a sectioned region sectioned by the rear floor cross member model 213.

The $D_1$.roof, the $D_1$.rear floor, and the $D_8$.middle floor are all sectioned regions sectioned only by panel part models. The $D_2$.roof rail, the $D_6$.B-pillar, the $D_9$.A-pillar, the $D_{10}$.middle floor member, the $D_{11}$.rear floor side member, and the $D_{12}$.rear floor cross member are all sectioned regions sectioned only by the body frame part model. The $D_3$.rear quarter side, the $D_4$.rear quarter upper, and the $D_5$.trunk room opening are all sectioned regions including the panel part model and the body frame part model.

The sectioned region set in the automotive body model 200 by the sectioned region setting unit 15 may be an assembly unit in consideration of the process of manufacturing the automotive body as described above, a body frame part model unit, or a panel part model unit. Alternatively, the sectioned region may be set in the automotive body model 200 using a computer aided engineering (CAE) analysis method such as sensitivity analysis.

(Vibration and Noise Reduction Target Panel Part Model Setting Unit)

The vibration and noise reduction target panel part model setting unit 17 sets a panel part model of a panel part to be reduced in vibration and noise among the panel part models as a vibration and noise reduction target panel part model in the automotive body model 200 in response to an instruction from an operator. In the present embodiment, the middle floor **103*a* (FIG. 2) of the automobile 100 is set as the vibration and noise reduction target, and the middle floor model 221 (FIG. 5) among the panel part models in the automotive body model 200** is set as the vibration and noise reduction target panel part model.

(Vibration Mode/Equivalent Radiation Power Peak Frequency Selection Unit)

The vibration mode/equivalent radiation power peak frequency selection unit 19 performs vibration analysis using the automotive body model 200 to obtain a vibration behavior of the vibration and noise reduction target panel part model and a frequency characteristic of equivalent radiation power which is an index of vibration and noise. Then, the vibration mode/equivalent radiation power peak frequency selection unit 19 selects a vibration mode that greatly contributes to vibration and noise and a peak frequency of equivalent radiation power corresponding to the vibration mode.

As the vibration analysis, for example, frequency response analysis, vibration mode analysis, or vibration energy analysis may be applied.

A vibration mode exists for each natural frequency in the vibration behavior of the vibration and noise reduction target panel part model obtained by the vibration analysis, but the vibration mode selected by the vibration mode/equivalent radiation power peak frequency selection unit 19 may be a vibration mode that greatly contributes to vibration and noise.

The equivalent radiation power is an index representing an acoustic characteristic radiated from a vibrating panel surface, and is proportional to a product of an area of the panel surface from which the sound is radiated and a square of a vibration speed of the panel surface. Therefore, the vibration mode/equivalent radiation power peak frequency selection unit 19 calculates the equivalent radiation power of the vibration and noise reduction target panel part model using the following Equation (1).

$$ERP = \eta * (1/2) C * RHO * \sum (A_i * v_i^2) \quad (1)$$

In Equation (1), η is a radiation loss coefficient, C is an acoustic wave velocity, RHO is a material density of the vibration and noise reduction target panel part model, $A_i$ is an area of a mesh i in the vibration and noise reduction target panel part model, and $v_i$ is a vibration speed of the mesh i. Then, as the vibration speed $v_i$, a value obtained for each mesh i by vibration analysis is given.

Figure 8:
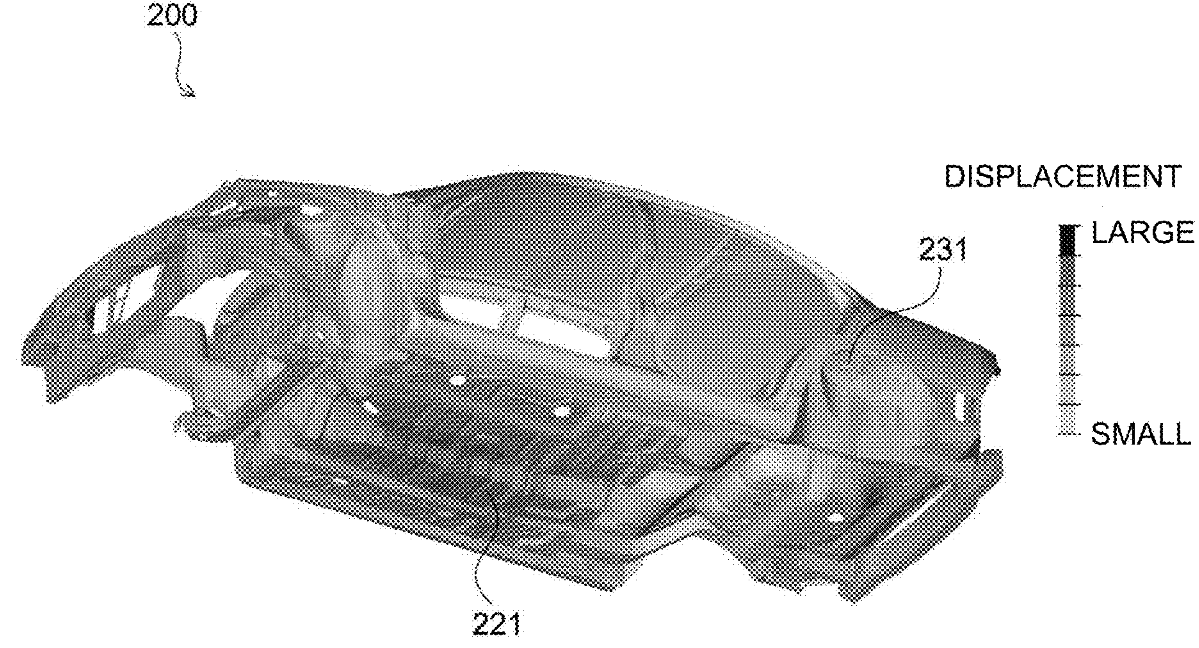
FIG. 8 is a diagram illustrating an example of displacement of vibration generated in the automotive body model in the first to third embodiments of the present invention.
Figure 9:
FIG. 9 is a diagram illustrating an example of frequency characteristics of equivalent radiation power of a middle floor model of the automotive body model in the first to third embodiments of the present invention.
Figure 9:
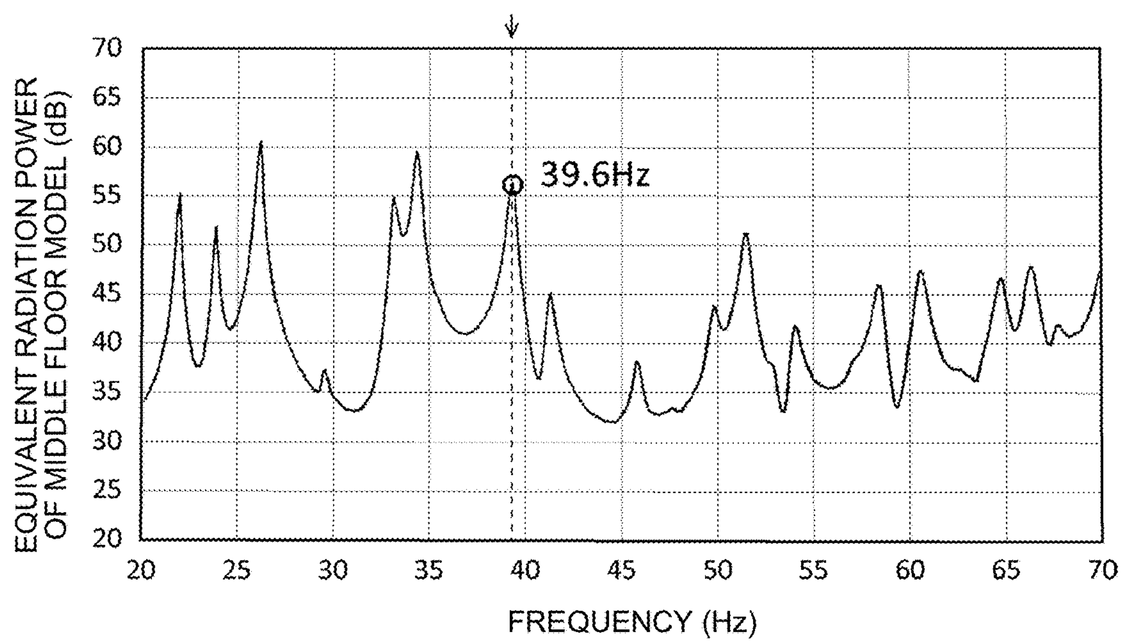

FIG. 8 illustrates displacement of vibration generated in the automotive body model 200, and FIG. 9 illustrates an example of a result of a frequency characteristic of equivalent radiation power of the middle floor model 221. In the present embodiment, as illustrated in FIG. 8, a primary vibration mode in which the central portion of the middle floor model 221 significantly vibrates (has large displacement) was selected. Then, the peak frequency (=39.6 Hz) of the equivalent radiation power corresponding to the selected vibration mode was selected from FIG. 9.

(Sectioned Region Weight Change Peak Frequency Acquisition Unit)

The sectioned region weight change peak frequency acquisition unit 21 changes the weight of one or a plurality of sectioned regions in the automotive body model 200, and performs vibration analysis for each combination of the weights of the sectioned regions. Then, the sectioned region weight change peak frequency acquisition unit 21 acquires the peak frequency of the equivalent radiation power of the vibration and noise reduction target panel part model in the vibration mode selected by performing the processing in the vibration mode/equivalent radiation power peak frequency selection unit 19. Table 1 shows an example of a combination (level) in which the weight of one or a plurality of sectioned regions in the automotive body model 200 is changed.

TABLE 1

| Level | $D_1$.Roof | $D_2$.Roof rail | $D_3$.Rear quarter side | $D_4$.Rear quarter upper | $D_5$.Trunk room openinc | $D_6$.B-pillar | $D_7$.Rear floor | $D_8$.Middle floor | $D_9$.A-pillar | $D_{10}$.Middle floor member | $D_{11}$.Rear floor side member | $D_{12}$.Rear floor cross member | Peak frequency (Hz) |
|---|---|---|---|---|---|---|---|---|---|---|---|---|---|
| 1 | 1.00 | 1.00 | 1.00 | 1.00 | 1.00 | 1.00 | 1.00 | 1.00 | 1.00 | 1.00 | 1.00 | 1.00 | 39.6 |
| 2 | 0.75 | 1.00 | 1.00 | 1.00 | 1.00 | 1.00 | 1.00 | 1.00 | 1.00 | 1.00 | 1.00 | 1.00 | 39.7 |
| 3 | 0.50 | 1.00 | 1.00 | 1.00 | 1.00 | 1.00 | 1.00 | 1.00 | 1.00 | 1.00 | 1.00 | 1.00 | 39.8 |
| 4 | 1.00 | 0.75 | 1.00 | 1.00 | 1.00 | 1.00 | 1.00 | 1.00 | 1.00 | 1.00 | 1.00 | 1.00 | 39.6 |
| 5 | 1.00 | 0.50 | 1.00 | 1.00 | 1.00 | 1.00 | 1.00 | 1.00 | 1.00 | 1.00 | 1.00 | 1.00 | 39.7 |
| 6 | 1.00 | 1.00 | 0.75 | 1.00 | 1.00 | 1.00 | 1.00 | 1.00 | 1.00 | 1.00 | 1.00 | 1.00 | 39.7 |
| 7 | 1.00 | 1.00 | 0.50 | 1.00 | 1.00 | 1.00 | 1.00 | 1.00 | 1.00 | 1.00 | 1.00 | 1.00 | 39.8 |
| 8 | 1.00 | 1.00 | 1.00 | 0.75 | 1.00 | 1.00 | 1.00 | 1.00 | 1.00 | 1.00 | 1.00 | 1.00 | 39.6 |
| 9 | 1.00 | 1.00 | 1.00 | 0.50 | 1.00 | 1.00 | 1.00 | 1.00 | 1.00 | 1.00 | 1.00 | 1.00 | 39.7 |
| 10 | 1.00 | 1.00 | 1.00 | 1.00 | 0.75 | 1.00 | 1.00 | 1.00 | 1.00 | 1.00 | 1.00 | 1.00 | 39.6 |
| 11 | 1.00 | 1.00 | 1.00 | 1.00 | 0.50 | 1.00 | 1.00 | 1.00 | 1.00 | 1.00 | 1.00 | 1.00 | 39.7 |
| 12 | 1.00 | 1.00 | 0.75 | 0.75 | 0.75 | 1.00 | 0.75 | 0.75 | 0.75 | 1.00 | 0.75 | 0.75 | 40.9 |
| 13 | 1.00 | 1.00 | 0.50 | 0.50 | 0.50 | 1.00 | 0.50 | 0.50 | 0.50 | 1.00 | 0.50 | 0.50 | 42.5 |
| 14 | 1.00 | 0.75 | 1.00 | 0.75 | 0.50 | 0.75 | 1.00 | 0.75 | 0.50 | 0.75 | 1.00 | 0.75 | 43.2 |
| 15 | 1.00 | 0.75 | 0.75 | 0.50 | 1.00 | 0.75 | 0.75 | 0.50 | 1.00 | 0.75 | 0.75 | 0.50 | 44.0 |
| 16 | 1.00 | 0.75 | 0.50 | 1.00 | 0.75 | 0.75 | 0.50 | 1.00 | 0.75 | 0.75 | 0.50 | 1.00 | 42.0 |
| 17 | 1.00 | 0.50 | 1.00 | 0.50 | 0.75 | 0.50 | 1.00 | 0.50 | 0.75 | 0.50 | 1.00 | 0.50 | 47.2 |
| 18 | 1.00 | 0.50 | 0.75 | 1.00 | 0.50 | 0.50 | 0.75 | 1.00 | 0.50 | 0.50 | 0.75 | 1.00 | 44.0 |
| 19 | 1.00 | 0.50 | 0.50 | 0.75 | 1.00 | 0.50 | 0.50 | 0.75 | 1.00 | 0.50 | 0.50 | 0.75 | 44.9 |
| 20 | 0.75 | 1.00 | 1.00 | 1.00 | 1.00 | 0.75 | 0.75 | 0.75 | 0.75 | 0.50 | 0.50 | 0.50 | 44.8 |
| 21 | 0.75 | 1.00 | 0.75 | 0.75 | 0.75 | 0.75 | 0.50 | 0.50 | 0.50 | 0.50 | 1.00 | 1.00 | 47.6 |
| 22 | 0.75 | 1.00 | 0.50 | 0.50 | 0.50 | 0.75 | 1.00 | 1.00 | 1.00 | 0.50 | 0.75 | 0.75 | 43.7 |

Level 1 is a combination in which the weight of any of the sectioned region $D_1$ to the sectioned region $D_{12}$ is not changed. Levels 2 to 11 are combinations in which the weight of any one of the sectioned regions is changed. Levels 12 to 22 are combinations in which the weights of the plurality of sectioned regions are simultaneously changed. In addition, numerical values described in the columns of the respective sectioned regions in Table 1 are weight ratios based on the weights of the respective sectioned regions in the original automotive body model 200. For example, in the level 2, the weight of the sectioned region $D_1$.roof is 0.75 times the weight of the $D_1$.roof in the original automotive body model 200.

The level number of the combination of the weights of the sectioned regions may be equal to or greater than the total number of sectioned regions set in the automotive body model 200, and may be set as a total combination for the sectioned regions set in the automotive body model, or may be efficiently set using experimental design.

(Sectioned Region Weight Contribution Degree Calculation Unit)

The sectioned region weight contribution degree calculation unit 23 performs multivariate analysis in which the peak frequency of the equivalent radiation power of the vibration and noise reduction target panel part model is set as an objective variable and the weight of the sectioned region is set as an explanatory variable. Then, the sectioned region weight contribution degree calculation unit 23 calculates the contribution degree of the weight of the sectioned region with respect to the peak frequency of the equivalent radiation power of the vibration and noise reduction target panel part model.

The regression model (relational expression) used for the multivariate analysis only needs to be expressed by the peak frequency (Y) as an objective variable and the weight ($M_i$)

of the sectioned region $D_i$ as an explanatory variable, and an example thereof includes the following Equation (2). $M_i$ in Equation (2) is a magnification of the weight of the sectioned region $D_i$ based on the weight $\rho_a$ of the sectioned region $D_i$ before the weight is changed as expressed by Equation (3). Further, $M_i$ may be a magnification of the density $\rho_b$ of the sectioned region $D_i$ based on the density $\rho_a$ of the sectioned region $D_i$ before the weight is changed.

$$\begin{cases} Y = A_0 + \sum A_i \times \log_2(1/M_i) \\ M_i = \rho_b/\rho_a \end{cases} \quad (2)$$

$$\begin{cases} A_0\text{:Constant} \\ A_i\text{:Partial regression coefficient of sectioned region } i \\ M_i\text{:Magnification of weight (density)} \\ \rho_a\text{:Reference weight (density)} \\ \rho_b\text{:Weight (density) after change} \end{cases} \quad (3)$$

Then, the sectioned region weight contribution degree calculation unit 23 calculates the value of the partial regression coefficient $A_i$ in the relational expression (Equation (2)) obtained by the multivariate analysis as the contribution degree of each sectioned region $D_i$ to the peak frequency.

Note that the regression model in the multivariate analysis only needs to have a form in which the objective variable (Y) is expressed by a linear combination of the explanatory variables ($M_i$), and for example, the following Equation (4) or Equation (5) may be used.

[Expression 3]

$$Y = A_0 + \sum A_i \times M_i \quad (4)$$

$$\log_2 Y = \sum A_i \times \log_2(M_i) \quad (5)$$

$$\begin{cases} A_0\text{:Constant} \\ A_i\text{:Partial regression coefficient of sectioned region } i \\ M_i\text{:Magnification of weight (density)} \end{cases}$$

When the partial regression coefficient $A_i$ in the regression model (Equation (2), Equation (4), Equation (5), and the like) is calculated by the sectioned region weight contribution degree calculation unit 23, a coefficient of determination or a degree-of-freedom adjusted determination coefficient (adjusted R-square) may be calculated. The coefficient of determination or the degree-of-freedom adjusted determination coefficient is an index representing the goodness of fit (degree) of the objective variable estimated by substituting the explanatory variable into the regression model. In the present embodiment, if the degree-of-freedom adjusted determination coefficient is 0.90 or more, the fit of the regression model is sufficiently good in estimating the peak frequency Y estimated by the weight $M_i$ of the sectioned region.

(Vibration and Noise Reduction and Weight Reduction Portion Identification Unit)

The vibration and noise reduction and weight reduction portion identification unit 25 identifies a portion to be reduced in weight in the automotive body of the automobile in order to reduce the vibration and noise of the panel part to be reduced in vibration and noise based on the contribution degree of each of the sectioned regions obtained by the sectioned region weight contribution degree calculation unit 23. That is, the vibration and noise reduction and weight reduction portion identification unit 25 identifies a portion in the automobile corresponding to the sectioned region $D_i$ having a large value of the partial regression coefficient $A_i$ in the relational expression (for example, Equation (2)) obtained by the multivariate analysis as a portion to be reduced in weight in order to reduce the vibration and noise of the panel part to be reduced in vibration and noise.

For example, a sheet thickness of the body frame part and/or the panel part included in the portion to be reduced in weight identified as described above may be reduced. By reducing the weight in this manner, the peak frequency of vibration and noise of the panel part to be reduced in vibration and noise becomes high, resonance with vibration from the vibration source and the noise source can be prevented, and a frequency band that is easily felt by a person can be removed, so that the vibration and noise of the panel part can be reduced.

<Vibration and Noise Reduction Analysis Method for Panel Part of Automobile>

A configuration of a vibration and noise reduction analysis method (hereinafter, simply referred to as a "vibration and noise reduction analysis method") for the panel part of the automobile according to the first embodiment of the present invention will be described below.

Figure 10:
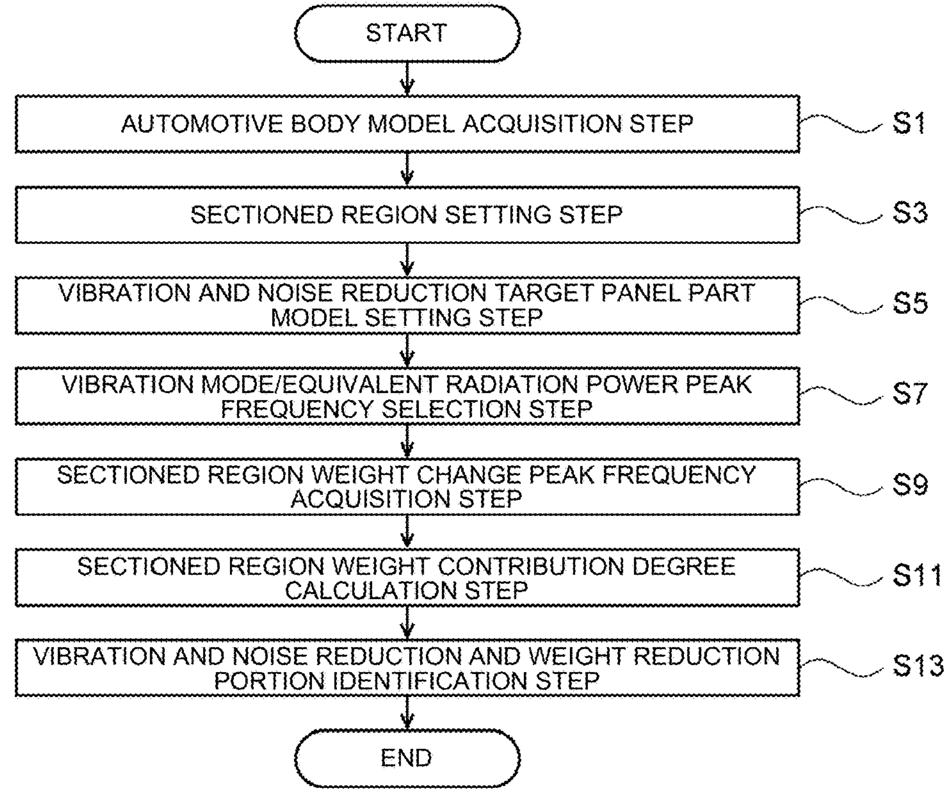
FIG. 10 is a flowchart illustrating a processing flow of a vibration and noise reduction analysis method for the panel part of the automobile according to the first embodiment of the present invention.

As illustrated in FIG. 2, the vibration and noise reduction analysis method according to the embodiment of the present invention reduces the vibration and noise of the panel part caused by vibration from the vibration source and the noise source in the automobile including the body frame part and the panel part, and identifies a portion at which the weight of the automotive body of the automobile can be reduced. As illustrated in FIG. 10, the vibration and noise reduction analysis method includes automotive body model acquisition step S1, sectioned region setting step S3, vibration and noise reduction target panel part model setting step S5, vibration mode/equivalent radiation power peak frequency selection step S7, sectioned region weight change peak frequency acquisition step S9, sectioned region weight contribution degree calculation step S11, and vibration and noise reduction and weight reduction portion identification step S13. Each of the above steps will be described below with reference to FIG. 10. In the following description, each of the above steps is executed using the vibration and noise reduction analysis device 1 (FIG. 1) according to the first embodiment of the present invention configured by a computer.

<<Automotive Body Model Acquisition Step>>

As illustrated in FIGS. 3 to 5 as an example, the automotive body model acquisition step S1 is a step of acquiring the automotive body model 200 including the body frame part model and the panel part model obtained by modeling each of the body frame part 101 and the panel part 103 (FIG. 2) of the automobile 100 (FIG. 2) with a mesh (two-dimensional element and/or three-dimensional element). Here, the excitation position to which the vibration from the vibration source and the noise source is input is set in the automotive body model 200. In the present embodiment, the automotive body model acquisition step S1 is performed by the automotive body model acquisition unit 13 of the vibration and noise reduction analysis device 1.

<<Sectioned Region Setting Step>>

The sectioned region setting step S3 is a step of setting a plurality of sectioned regions sectioned based on the body frame part model and the panel part model in the automotive body model 200. In the present embodiment, the sectioned region setting step S3 is performed by the sectioned region setting unit 15 of the vibration and noise reduction analysis device 1.

The sectioned region of the automotive body model 200 set in the sectioned region setting step S3 may be an assembly unit in consideration of a process of manufacturing the automotive body, the body frame part model, or panel part model unit. Alternatively, the sectioned region may be set in the automotive body model 200 using a CAE analysis method such as sensitivity analysis.

<<Vibration and Noise Reduction Target Panel Part Model Setting Step>>

The vibration and noise reduction target panel part model setting step S5 is a step of setting, as a vibration and noise reduction target panel part model, a panel part model of a panel part to be reduced in vibration and noise among panel part models in the automotive body model 200. In the present embodiment, the vibration and noise reduction target panel part model setting step S5 is performed by the vibration and noise reduction target panel part model setting unit 17 of the vibration and noise reduction analysis device 1.

<<Vibration Mode/Equivalent Radiation Power Peak Frequency Selection Step>>

The vibration mode/equivalent radiation power peak frequency selection step S7 is a step of performing vibration analysis using the automotive body model 200, obtaining a vibration behavior of the vibration and noise reduction target panel part model and a frequency characteristic of equivalent radiation power as an index of vibration and noise, and selecting a vibration mode that greatly contributes to vibration and noise and a peak frequency of equivalent radiation power corresponding to the vibration mode. In the present embodiment, the vibration mode/equivalent radiation power peak frequency selection step S7 is performed by the vibration mode/equivalent radiation power peak frequency selection unit 19 of the vibration and noise reduction analysis device 1.

As the vibration analysis, for example, the vibration behavior of the vibration and noise reduction target panel part model can be obtained by applying frequency response analysis, vibration mode analysis, or vibration energy analysis. The vibration behavior of the vibration and noise reduction target panel part model obtained by the vibration analysis includes a vibration mode for each natural frequency, and in the vibration mode/equivalent radiation power peak frequency selection step S7, a vibration mode that greatly contributes to vibration and noise is selected. For example, a primary vibration mode in which the central portion of the vibration and noise reduction target panel part model significantly vibrates may be selected.

The equivalent radiation power is calculated by Equation (1) described above based on the result of the vibration behavior of the vibration and noise reduction target panel part model obtained by the vibration analysis.

<<Sectioned Region Weight Change Peak Frequency Acquisition Step>>

The sectioned region weight change peak frequency acquisition step S9 is a step of changing the weight of one or a plurality of sectioned regions in the automotive body model 200, performing vibration analysis for each combination of the weights of the sectioned regions, and performing the processing in the vibration mode/equivalent radiation power peak frequency selection step S7 to acquire the peak frequency of the equivalent radiation power of the vibration and noise reduction target panel part model in the selected vibration mode. In the first embodiment, the sectioned region weight change peak frequency acquisition step S9 is performed by the sectioned region weight change peak frequency acquisition unit 21 of the vibration and noise reduction analysis device 1.

Changing the weight of one or a plurality of sectioned regions in the automotive body model 200 means changing the weight of one sectioned region or simultaneously changing the weight of a plurality of sectioned regions.

The level number of the combination of the weights of the sectioned regions in the automotive body model may be equal to or greater than the total number of sectioned regions set in the automotive body model 200, and may be set as a total combination for the sectioned regions, or may be efficiently set using an experimental design.

<<Sectioned Region Weight Contribution Degree Calculation Step>>

The sectioned region weight contribution degree calculation step S11 is a step of performing multivariate analysis in which the peak frequency of the equivalent radiation power of the vibration and noise reduction target panel part model is set as an objective variable and the weight of the sectioned region is set as an explanatory variable, and calculating the contribution degree of the weight of the sectioned region with respect to the peak frequency of the equivalent radiation power of the vibration and noise reduction target panel part model. In the first embodiment, the sectioned region weight contribution degree calculation step S11 is performed by the sectioned region weight contribution degree calculation unit 23 of the vibration and noise reduction analysis device 1.

The relational expression (regression model) derived by the multivariate analysis only needs to be expressed by the peak frequency (Y) as an objective variable and the weight ($M_i$) of the sectioned region $D_i$ as an explanatory variable, and examples thereof include the above-described Equation (2), Equation (4), or Equation (5).

Then, the sectioned region weight contribution degree calculation unit 23 acquires the partial regression coefficient $A_i$ in Equation (2), Equation (4), or Equation (5) obtained by the multivariate analysis as the contribution degree of each sectioned region $D_i$ to the peak frequency.

In addition, when the partial regression coefficient $A_i$ in the regression model (Equation (2), Equation (4), Equation (5), and the like) is calculated in the sectioned region weight contribution degree calculation step S11, if the degree-of-freedom adjusted determination coefficient is 0.90 or more, the fit of the regression model is sufficiently good in the estimation of the peak frequency of the equivalent radiation power by the weight of the sectioned region.

<<Vibration and Noise Reduction and Weight Reduction Portion Identification Step>>

The vibration and noise reduction and weight reduction portion identification step S13 is a step of identifying a portion to be reduced in weight in the automotive body of the automobile in order to reduce the vibration and noise of the panel part to be reduced in vibration and noise based on the contribution degree of each of the sectioned regions calculated in the sectioned region weight contribution degree calculation step S11. In the first embodiment, the vibration and noise reduction and weight reduction portion identification step S13 is performed by the vibration and noise reduction and weight reduction portion identification unit 25 of the vibration and noise reduction analysis device 1.

Specifically, the vibration and noise reduction and weight reduction portion identification unit 25 identifies a portion in the automobile corresponding to the sectioned region $D_i$ having a large value of the partial regression coefficient $A_i$ in the relational expression (Equation (2) or the like) obtained by the multivariate analysis in the sectioned region weight contribution degree calculation step S11 as a portion to be reduced in weight in the automotive body in order to reduce vibration and noise.

In order to reduce the weight of the identified portion, for example, the thickness of the body frame part and/or the panel part forming the portion may be reduced to reduce the weight thereof. Then, by taking such measures, the peak frequency of the vibration and noise of the panel part to be reduced in vibration and noise can be increased, such that resonance with vibration from the vibration source and the noise source can be prevented, and the vibration and noise can be reduced by removing a frequency band that is easily felt by a person.

Second Embodiment

A vibration and noise reduction analysis method for a panel part of an automobile according to a second embodiment of the present invention derives a relational expression between a peak frequency of equivalent radiation power of the vibration and noise reduction target panel part model and a weight of each of the sectioned regions in the sectioned region weight contribution degree calculation step S11 of the vibration and noise reduction analysis method for the panel part of the automobile according to the first embodiment of the present invention described above, predicts a peak frequency of equivalent radiation power of the vibration and noise reduction target panel part model by changing the weight of at least one or more of the sectioned regions from that at the time of deriving the relational expression and giving the changed weight to the derived relational expression, and identifies a portion to be reduced in weight in the automotive body of the automobile in order to reduce vibration and noise of a panel part caused by vibration from a vibration source and a noise source in the automobile.

As a result, by performing the vibration analysis once to obtain the frequency characteristic of the equivalent radiation power of the vibration and noise reduction target panel part model by changing the weight of one or a plurality of sectioned regions set in the automotive body model in advance and obtaining the relational expression, it is possible to easily obtain an index of how high the peak frequency of the equivalent radiation power, which is an index of the vibration and noise of the panel part to be reduced in vibration and noise, can be increased by reducing the weight of the portion including the automotive body frame part or the panel part of the automobile.

The relational expression between the peak frequency of the equivalent radiation power of the vibration and noise reduction target panel part model and the weight of the sectioned region set in the automotive body model may be any one of Equations (2), (4), and (5) described in the first embodiment, and is not particularly limited thereto.

Third Embodiment

A vibration and noise reduction analysis method for a panel part of an automobile according to a third embodiment of the present invention derives a relational expression between a peak frequency of equivalent radiation power of the vibration and noise reduction target panel part model and a weight of each of the sectioned regions in the sectioned region weight contribution degree calculation step S11 of the first embodiment described above, and calculates a weight of one sectioned region by giving weights of the other sectioned regions and a peak frequency of the equivalent radiation power of the vibration and noise reduction target panel part model with respect to one sectioned region for which a sheet thickness is to be calculated using the derived relational expression, and calculates a sheet thickness of the body frame part model and/or the panel part model forming the one sectioned region based on the calculated weight of the one sectioned region.

As described above, by using the relational expression between the peak frequency of the equivalent radiation power and the weight of the sectioned region, not only one or a plurality of portions to be reduced in weight can be easily selected as a vibration and noise reduction measure, but also an effect of improving the peak frequency of the equivalent radiation power by reducing the weight of one or a plurality of portions in the automotive body of the automobile can be estimated as a vibration and noise reduction measure, thereby making it possible to easily perform a car-body design that achieves both the reduction of the vibration and noise from the panel part and the weight reduction of the automobile.

The relational expression between the peak frequency of the equivalent radiation power and the weight of the sectioned region set in the automotive body model may be any one of Equations (2), (4), and (5) described in the first embodiment of the vibration and noise reduction target panel part model, similarly to the second embodiment, and is not particularly limited thereto.

However, when the peak frequency of the equivalent radiation power given to the relational expression is too high as compared with the peak frequency of the equivalent radiation power obtained using the automotive body model before the weight of each of the sectioned regions is changed, the change in rigidity (for example, the rigidity of the part deteriorates due to too thin sheet thickness) accompanying the weight change of the sectioned region may significantly affect the vibration behavior of the vibration and noise reduction target panel part model, and correlation (accuracy of a predicted value) between the peak frequency (Y) of the equivalent radiation power and the weight ($M_i$) of the sectioned region in the relational expression such as Equation (2) may deteriorate.

Therefore, as another aspect of the vibration and noise reduction analysis method for the panel part of the automobile according to the third embodiment, it is preferable to calculate the weight of one sectioned region by giving the peak frequency of the equivalent radiation power and the weights of the other sectioned regions excluding one sectioned region for which the sheet thickness has been calculated, to Equation (6) obtained by giving a correction value $\alpha_i$ for correcting the influence on the peak frequency of the equivalent radiation power due to weight reduction of the sectioned region $D_i$ to be changed in the weight to Equation (2), which is a relational expression between the peak frequency of the equivalent radiation power and the weight of the sectioned region. In this case, the correction value $\alpha_i$, that minimizes the residual sum of squares between the predicted value calculated from the relational expression by changing several conditions in advance for the sheet thickness of the sectioned region and the calculated value obtained by the vibration analysis, may be obtained and set.

$$Y=A_0+\Sigma A_i\times\log_2(1/\alpha_i M_i) \tag{6}$$

The correction value $\alpha_i$ is desirably obtained by the above-described method or the like for each of the sectioned regions selected for obtaining the weight. In Equation (6), $\alpha_i=1$ may be given without correction for the weights of the other sectioned regions, and the correction value $\alpha_i$ may be appropriately given for the other sectioned regions giving a significantly changed weights.

As described above, according to another aspect of the vibration and noise reduction analysis method for the panel part of the automobile according to the third embodiment, it is possible to accurately estimate the sheet thickness of the portion where the vibration and noise reduction measures are taken while considering the change in rigidity due to the reduction in weight of the portion, and to achieve both the reduction in vibration and noise of the panel part and the reduction in weight of the automotive body.

EMBODIMENT

A numerical experiment for verifying the effect of the vibration and noise reduction analysis device and the analysis method for the panel part of the automobile according to the present invention has been performed, and the numerical experiment will be described below.

In the numerical experiment, as illustrated in FIGS. 3 to 5, together with the panel part model and the body frame part model obtained by modeling each of the body frame part 101 and the panel part 103 (FIG. 2) of the automobile 100 with a mesh (two-dimensional element and/or three-dimensional element), the automotive body model 200 in which a portion corresponding to the rear suspension mounting part 107 (FIG. 2) of the automobile 100 was set as the excitation position 231 was analyzed. Then, the middle floor 103*a* of the automobile 100 was set as a vibration and noise reduction target, and the middle floor model 221 in the automotive body model 200 was set as a vibration and noise reduction target panel part model. Physical property values shown in Table 2 were set for both the body frame part model and the panel part model in the automotive body model 200.

TABLE 2

| Material | Young's modulus (GPa) | Density (g/cm$^3$) |
|---|---|---|
| Steel | 210 | 7.89 |

Further, the sectioned regions $D_1$ to $D_{12}$ were set for the automotive body model 200, as illustrated in FIGS. 6 and 7. The body frame part model and the panel part model forming each of the sectioned regions $D_1$ to $D_{12}$ are as described in the first embodiment. Then, as the analysis for reducing the vibration and noise of the middle floor 103*a* of the automobile 100 and reducing the weight of the automotive body, A. identification of a vibration and noise reduction and weight reduction portion, B. prediction of the peak frequency of the equivalent radiation power of the middle floor model in the automotive body model, and C. calculation of the sheet thickness of the vibration and noise reduction and weight reduction portion were performed. Hereinafter, A to C will be described in order.

[A. Identification of Vibration and Noise Reduction and Weight Reduction Portion]

A portion for reducing the weight of the automotive body in the automobile, which is a sectioned region contributing to the reduction in vibration and noise of the middle floor model 221 of the automotive body model 200, was identified. First, frequency response analysis was performed using the automotive body model 200 to obtain the vibration behavior of the middle floor model and the frequency characteristics of the equivalent radiation power. As described in the first embodiment, a vibration mode in which the central portion of the middle floor model significantly vibrates was selected from the result of the vibration analysis, and the peak frequency of the equivalent radiation power corresponding to the vibration mode was acquired.

Subsequently, frequency response analysis was performed by changing the weight of one or a plurality of sectioned regions $D_1$ to $D_{12}$, and the peak frequency of the equivalent radiation power was obtained for each combination of the weights of the sectioned regions. Here, the number of levels of weight combinations of the sectioned regions $D_1$ to $D_{12}$ was set to 52. Table 1 described above shows a part of the combinations of weights of the sectioned regions.

Then, the multivariate analysis was performed with the peak frequency (Y) of the equivalent radiation power obtained based on the result of the vibration analysis as an objective variable and the weight ($M_i$) of the sectioned region $D_i$ as an explanatory variable to obtain a relational expression between the peak frequency Y of the equivalent radiation power and the weight $M_i$ of the sectioned region. Here, the multiple regression analysis was performed as multivariate analysis, and Equation (2) was used as a regression model. The relational expression obtained by the multivariate analysis is shown in Equation (7). In addition, in Table 3, the partial regression coefficient $A_i$ in Equation (7) and a standard partial regression coefficient obtained by the multivariate analysis are shown together.

$$Y = 39.6 - 0.07\times\log_2\left(\frac{1}{M_1}\right) + 0.27\times\log_2\left(\frac{1}{M_2}\right) - 0.25\times\log_2\left(\frac{1}{M_3}\right) + 0.72\times\log_2\left(\frac{1}{M_4}\right) - 0.10\times\log_2\left(\frac{1}{M_5}\right) + 0.47\times\left(\frac{1}{M_6}\right) + 0.35\times\log_2\left(\frac{1}{M_7}\right) + 1.81\times\log_2\left(\frac{1}{M_8}\right) + 0.90\times\log_2\left(\frac{1}{M_9}\right) + 3.57\times\log_2\left(\frac{1}{M_{10}}\right) + 0.001\times\log_2\left(\frac{1}{M_{11}}\right) + 0.08\times\log_2\left(\frac{1}{M_{12}}\right) \quad (7)$$

TABLE 3

| Region | $D_1$.Roof | $D_2$.Roof rail | $D_3$.Rear quarter side | $D_4$.Rear quarter upper | $D_5$.Trunk room opening | $D_6$.B-pillar | $D_7$.Rear floor | $D_8$. Middle floor | $D_9$.A-pillar | $D_{10}$. Middle floor member | $D_{11}$.Rear floor side member | $D_{12}$.Rear floor cross member |
|---|---|---|---|---|---|---|---|---|---|---|---|---|
| Partial regression coefficient $A_i$ | −0.07 | 0.27 | −0.25 | 0.72 | −0.10 | 0.47 | 0.35 | 1.81 | 0.90 | 3.57 | 0.00 | 0.08 |

TABLE 3-continued

| Region | $D_1$.Roof | $D_2$.Roof rail | $D_3$.Rear quarter side | $D_4$.Rear quarter upper | $D_5$.Trunk room opening | $D_6$.B-pillar | $D_7$.Rear floor | $D_8$. Middle floor | $D_9$.A-pillar | $D_{10}$. Middle floor member | $D_{11}$.Rear floor side member | $D_{12}$.Rear floor cross member |
|---|---|---|---|---|---|---|---|---|---|---|---|---|
| Standard partial regression coefficient | −0.01 | 0.05 | −0.05 | 0.12 | −0.02 | 0.08 | 0.06 | 0.32 | 0.16 | 0.64 | 0.00 | 0.01 |

From Equation (7) and Table 3, it can be seen that the weights of the sectioned region $D_8$ (middle floor, $A_8$=1.81) and the sectioned region $D_{10}$ (middle floor member, $A_{10}$=3.57) having a large value of the partial regression coefficient $A_1$ have a large contribution degree to the peak frequency of the equivalent radiation power of the middle floor model 221.

On the other hand, it can be seen that the weight of the sectioned region having a small value of the partial regression coefficient, for example, the weights of $D_1$ (roof, $A_1$=−0.07) or $D_1$, (rear floor side member, $A_{11}$=0.001) has a small contribution degree of the equivalent radiation power of the middle floor model 221 to the peak frequency.

From the above results, it was possible to identify a portion in the automotive body corresponding to each of the sectioned region $D_8$.middle floor, and the sectioned region $D_{10}$.middle floor member as a portion to be reduced in weight as a vibration and noise reduction measure.

[B. Prediction of Peak Frequency of Equivalent Radiation Power]

Next, the peak frequency of the equivalent radiation power was predicted. Equation (7) described above was used as a relational expression between the peak frequency of the equivalent radiation power and the weight of the sectioned region. The peak frequency (predicted value) of the equivalent radiation power was obtained by changing each of the weights of the $D_{10}$.middle floor member which is a sectioned region having a high contribution to the peak frequency of the equivalent radiation power of the middle floor model 221 in the automotive body model 200 (refer to FIGS. 4 and 5) and the $D_{11}$.rear floor side member which is a sectioned region having a low contribution thereto. On the other hand, as a comparison target, frequency response analysis was performed on the automotive body model 200 in which the weight of the sectioned region $D_{10}$.middle floor member or the sectioned region $D_{11}$.rear floor side member was changed, and the frequency response of the equivalent radiation power of the middle floor model 221 was obtained, thereby obtaining the peak frequency (calculated value) to be the vibration mode (the primary vibration mode) in which the central portion of the middle floor model 221 is significantly deformed. Table 4 shows the weights of the sectioned region $D_{10}$.middle floor member and the sectioned region $D_{11}$.rear floor side member, and the result (predicted value) of the peak frequency predicted by Equation (7). Table 4 also shows a result (calculated value) of obtaining the peak frequency of the equivalent radiation power of the middle floor model 221 using the original automotive body model 200.

TABLE 4

| | Weight (kgf) | | | Peak frequency (Hz) | | |
|---|---|---|---|---|---|---|
| No. | $D_{10}$.Midddle floor member | $D_{11}$.Rear floor side member | Difference from original automotive body | Predicted value (Hz) | Calculated value (Hz) | Difference in calculated value from original automotive body |
| 1 | 10.4 (One time) | 14.9 (One time | — | 39.6 | 39.6 | — |
| 2 | 10.4 (One time) | 7.4 (0.5 times) | −7.5 | 39.6 | 39.8 | 0.2 |
| 3 | 5.2 (0.5 times) | 14.9 (One time) | −5.2 | 43.1 | 42.8 | 3.2 |

In Table 4, No. 1 indicates a case in which frequency response analysis was performed using the original automotive body model 200, No. 2 indicates a case in which the weight of the sectioned region $D_{11}$.rear floor side member was 0.5 times, and No. 3 indicates a case in which the weight of the sectioned region $D_{10}$.middle floor member was 0.5 times.

As shown in Table 4, the predicted value of the peak frequency of the equivalent radiation power obtained by Equation (7) was substantially equal to the calculated value of the peak frequency of the equivalent radiation power obtained by performing the vibration analysis on the automotive body model 200.

When the weight of the sectioned region $D_{11}$.rear floor side member having a low contribution degree was changed (0.5 times) (No. 2), both the predicted value and the calculated value of the peak frequency of the equivalent radiation power were substantially equal to the peak frequency of the equivalent radiation power obtained by the vibration analysis of the automotive body model 200 before the weight of the rear floor side member was changed.

On the other hand, when the weight of the sectioned region $D_{10}$.middle floor member having a high contribution degree was changed, both the predicted value and the calculated value of the peak frequency of the equivalent radiation power were higher than the peak frequency of the original automotive body model by 3.5 Hz and 3.2 Hz.

From this, it was shown that the peak frequency of the vibration and noise hardly changes even if the weight of $D_{11}$.rear floor side member having a low contribution degree to the peak frequency of the equivalent radiation power of the middle floor model is changed, whereas the peak frequency can be increased by 3 Hz or more by changing the weight of $D_{10}$.middle floor member having a high contribution degree by 0.5 times, thereby making it possible to achieve both the weight reduction of the automotive body and the reduction in vibration and noise.

[Calculation of Sheet Thickness of Vibration and Noise Reduction and Weight Reduction Portion]

Subsequently, an influence of a sheet thickness on the peak frequency of the vibration and noise reduction and weight reduction portion was examined. Here, the peak frequency of the equivalent radiation power of the middle floor model 221 (refer to FIGS. 4 and 5) when a sheet thickness of the sectioned region $D_{10}$.middle floor member model was changed was predicted using Equation (7) described above as a relational expression between the peak frequency of the equivalent radiation power and the weight of the sectioned region. Furthermore, the peak frequency was predicted also for a case in which a correction value $\alpha_i$ was given in consideration of a rigidity change due to the weight reduction of the sectioned region $D_{10}$.middle floor member model. Table 5 shows predicted and calculated values of the peak frequency.

TABLE 5

| | $D_{10}$.Middle floor member | | | | Peak frequency (Hz) | | | |
|---|---|---|---|---|---|---|---|---|
| | | | Weight | | | | | |
| No. | Sheet thickness (mm) | Weight (kgf) | difference from original automotive body (kgf) | Weight ratio to original automotive body (—) | Predicted value (not corrected) | Predicted value (corrected) | Calculated value | Difference in calculated value from original automotive body |
| 1 | 1.2 | 10.4 | — | 1.0 | 39.6 | 39.6 | 39.6 | — |
| 4 | 0.9 | 7.8 | −2.6 | 0.8 | 40.5 | 41.4 | 42.4 | 2.8 |
| 5 | 0.8 | 6.9 | −3.5 | 0.7 | 41.0 | 42.0 | 41.9 | 2.3 |

In Table 5, No. 1 is the weight of the $D_{10}$.middle floor member in the original automotive body model 200, and No. 4 and No. 5 are the cases in which the sheet thickness of the parts forming the sectioned region $D_{10}$.middle floor member is reduced from 1.2 mm to 0.9 mm and 0.8 mm, respectively.

As can be seen from Table 5, the predicted value and the calculated value of the peak frequency were both higher than those of the original automotive body due to the change of the sheet thickness of the sectioned region $D_{10}$.middle floor member. Accordingly, the peak frequency was higher as the sheet thickness was thinner, that is, as the weight was reduced. In addition, regarding the predicted value, by giving the correction value $\alpha_i$ of the change in rigidity due to the weight reduction of the above-described Equation (6), a good result was obtained close to the calculated value.

The above result is achieved by changing the sheet thickness of the sectioned region having a large contribution degree to the vibration and noise of the vibration and noise reduction target panel part model to obtain the peak frequency. However, even when the sheet thickness of the sectioned region is obtained by giving the peak frequency, the sheet thickness can be obtained so as to satisfy a predetermined peak frequency, and the reduction in vibration and noise and the reduction in weight can be achieved.

Furthermore, by giving the correction value related to the change in rigidity due to the weight change of the sectioned region, the sheet thickness of the sectioned region can be estimated with higher accurately.

INDUSTRIAL APPLICABILITY

According to the present invention, it is possible to provide a vibration and noise reduction analysis device and an analysis method for a panel part of an automobile that reduce vibration and noise of the panel part caused by vibration from a vibration source and a noise source in the automobile and identify a portion at which a weight of an automotive body of the automobile can be reduced.

REFERENCE SIGNS LIST

1 VIBRATION AND NOISE REDUCTION ANALYSIS DEVICE
3 DISPLAY DEVICE
5 INPUT DEVICE
7 MEMORY STORAGE
9 WORKING DATA MEMORY
11 ARITHMETIC PROCESSING UNIT
13 AUTOMOTIVE BODY MODEL ACQUISITION UNIT
15 SECTIONED REGION SETTING UNIT
17 VIBRATION AND NOISE REDUCTION TARGET PANEL PART MODEL SETTING UNIT
19 VIBRATION MODE/EQUIVALENT RADIATION POWER PEAK FREQUENCY SELECTION UNIT
21 SECTIONED REGION WEIGHT CHANGE PEAK FREQUENCY ACQUISITION UNIT
23 SECTIONED REGION WEIGHT CONTRIBUTION DEGREE CALCULATION UNIT
25 VIBRATION AND NOISE REDUCTION AND WEIGHT REDUCTION PORTION IDENTIFICATION UNIT
30 AUTOMOTIVE BODY MODEL FILE
100 AUTOMOBILE
101 BODY FRAME PART
103 PANEL PART
**103*a*** MIDDLE FLOOR
105 VIBRATION SOURCE AND NOISE SOURCE
**105*a*** ENGINE
**105*b*** TIRE
106 FRONT SUSPENSION MOUNTING PART
107 REAR SUSPENSION MOUNTING PART
200 AUTOMOTIVE BODY MODEL
201 ROOF RAIL MODEL
203 A-PILLAR MODEL

205 B-PILLAR MODEL
207 C-PILLAR MODEL
209 MIDDLE FLOOR MEMBER MODEL
211 REAR FLOOR SIDE MEMBER MODEL
213 REAR FLOOR CROSS MEMBER MODEL
221 MIDDLE FLOOR MODEL
223 ROOF MODEL
225 REAR FLOOR MODEL
231 EXCITATION POSITION
241 UPPER BACK PANEL MODEL
243 LOWER BACK PANEL MODEL
245 QUARTER INNER MODEL
247 WHEEL HOUSE MODEL

The invention claimed is:

1. A vibration and noise reduction analysis device for a panel part of an automobile, the vibration and noise reduction analysis device being configured to reduce vibration and noise of the panel part caused by vibration from a vibration source and a noise source in the automobile and identify a portion at which a weight of an automotive body of the automobile can be reduced, the device comprising:

a memory storing instructions; and a processor program med to execute the instructions to:

acquire an automotive body model including a body frame part model and a panel part model obtained by modeling each of a body frame part and a panel part forming the automotive body of the automobile with a mesh, in which an excitation position where the vibration from the vibration source and the noise source is input is set;

a plurality of sectioned regions sectioned based on the body frame part model and the panel part model in the automotive body model;

set, as a vibration and noise reduction target panel part model, a panel part model of a panel part to be reduced in vibration and noise among the panel part models in the automotive body model in response to an instruction from an operator;

perform vibration analysis using the automotive body model, to obtain a vibration behavior of the vibration and noise reduction target panel part model and a frequency characteristic of equivalent radiation power which is an index of the vibration and noise, and select a vibration mode having a large contribution to the vibration and noise and a peak frequency of the equivalent radiation power corresponding to the vibration mode;

change a weight of one or a plurality of sectioned regions in the automotive body model, to perform the vibration analysis for each combination of weights of the sectioned regions in the automotive body model, and acquire a peak frequency of equivalent radiation power of the vibration and noise reduction target panel part model in the selected vibration mode;

perform multivariate analysis in which the peak frequency of the equivalent radiation power of the vibration and noise reduction target panel part model is set as an objective variable and the weight of the sectioned region is set as an explanatory variable, and calculate a contribution degree of the weight of the sectioned region to the peak frequency of the equivalent radiation power of the vibration and noise reduction target panel part model;

identify a portion to be reduced in weight in the automotive body of the automobile in order to reduce the vibration and noise of the panel part to be reduced in vibration and noise based on the calculated contribution degree of each of the sectioned regions, derive a relational expression b tween the peak frequency of the equivalent radiation power of the vibration and noise reduction target panel part model and the weight of each of the sectioned regions;

select one sectioned region for which a sheet thickness is to be calculated;

calculate the weight of the selected one sectioned region by giving, to the derived relational expression, a weight of another sectioned region excluding the one sectioned region and the peak frequency of the equivalent radiation power of the vibration and noise reduction target panel part model; and calculate the sheet thickness of the body frame part model and/or the panel part model forming the one sectioned region based on the calculated weight of the one sectioned region.

2. A vibration and noise reduction analysis method for a panel part of an automobile, the vibration and noise reduction analysis method causing a computer to perform following steps to reduce vibration and noise of the panel part caused by vibration from a vibration source and a noise source in the automobile and to identify a portion at which a weight of an automotive body of the automobile can be reduced, the method comprising:

acquiring an automotive body model including a body frame part model and a panel part model obtained by modeling each of a body frame part and a panel part forming the automotive body of the automobile with a mesh, in which an excitation position where the vibration from the vibration source and the noise source is input is set;

setting a plurality of sectioned regions sectioned based on the body frame part model and the panel part model in the automotive body model;

setting, as a vibration and noise reduction target panel part model, a panel part model of a panel part to be reduced in vibration and noise among the panel part models in the automotive body model;

performing vibration analysis using the automotive body model, obtaining a vibration behavior of the vibration and noise reduction target panel part model and a frequency characteristic of equivalent radiation power which is an index of vibration and noise, and selecting a vibration mode having a large contribution to the vibration and noise and a peak frequency of the equivalent radiation power corresponding to the vibration mode;

changing a weight of one or a plurality of sectioned regions in the automotive body model, performing the vibration analysis for each combination of weights of the sectioned regions in the automotive body model, and acquiring a peak frequency of equivalent radiation power of the vibration and noise reduction target panel part model in the selected vibration mode;

performing multivariate analysis in which the peak frequency of the equivalent radiation power of the vibration and noise reduction target panel part model is set as an objective variable and the weight of the sectioned region is set as an explanatory variable, and calculating a contribution degree of the weight of the sectioned region to the peak frequency of the equivalent radiation power of the vibration and noise reduction target panel part model;

identifying a portion to be reduced in weight in the automotive body of the automobile in order to reduce vibration and noise of the panel part to be reduced in vibration and noise based on the calculated contribution degree of each of the sectioned regions;

deriving a relational expression between the peak frequency of the equivalent radiation power of the vibration and noise reduction target panel part model and the weight of each of the sectioned regions;

selecting one sectioned region for which a sheet thickness is to be calculated;

calculating the weight of the selected one sectioned region by giving, to the derived relational expression, a weight of another sectioned region excluding the one sectioned region and the peak frequency of the equivalent radiation power of the vibration and noise reduction target panel part model; and calculating the sheet thickness of the body frame part model and/or the panel part model forming the one sectioned region based on the calculated weight of the one sectioned region.

3. The vibration and noise reduction analysis method for the panel part of the automobile according to claim 2, further comprising predicting the peak frequency of the equivalent radiation power of the vibration and noise reduction target panel part model by changing the weight of at least one or more of the sectioned regions and giving the changed weight to the derived relational expression, and identifying the portion to be reduced in weight in the automotive body of the automobile to reduce the vibration and noise of the panel part caused by the vibration from the vibration source and the noise source in the automobile.

4. The vibration and noise reduction analysis method for the panel part of the automobile according to claim 2, wherein, when the weight of the one selected sectioned region is calculated by the relational expression, a correction value of correcting an influence of a change in the weight of the one sectioned region on the peak frequency of the equivalent radiation power is given to the relational expression, and the weight of the one sectioned region is calculated.

* * * * *